United States Patent
Mann

(10) Patent No.: US 10,371,314 B2
(45) Date of Patent: Aug. 6, 2019

(54) CABLE TRAY BRACKET

(71) Applicant: SST Systems, Inc., Sturgeon Bay, WI (US)

(72) Inventor: Stephen C. Mann, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

(21) Appl. No.: 15/843,650

(22) Filed: Dec. 15, 2017

(65) Prior Publication Data

US 2019/0186684 A1 Jun. 20, 2019

(51) Int. Cl.
| | |
|---|---|
| *F16M 13/00* | (2006.01) |
| *G02B 6/44* | (2006.01) |
| *H02G 3/04* | (2006.01) |
| *F16M 13/02* | (2006.01) |

(52) U.S. Cl.
CPC .......... *F16M 13/02* (2013.01); *H02G 3/0456* (2013.01); *G02B 6/4452* (2013.01); *G02B 6/4459* (2013.01); *H02G 3/0443* (2013.01)

(58) Field of Classification Search
CPC .. G02B 6/4452; G02B 6/4459; H02G 3/0443; H02G 3/0456; F16M 13/02; Y10T 29/49174; Y10Y 29/49826
USPC ...... 248/300, 302, 304, 317, 220.21, 221.11, 248/68.1, 339, 343
See application file for complete search history.

(56) References Cited

U.S. PATENT DOCUMENTS

| | | | |
|---|---|---|---|
| 6,189,248 B1* | 2/2001 | Nagel | G09F 3/204 248/222.51 |
| 6,401,939 B1* | 6/2002 | Durin | H02G 3/0443 211/26 |
| 6,590,154 B1 | 7/2003 | Badey et al. | |
| 6,766,992 B1* | 7/2004 | Parker | F16M 13/022 248/218.4 |
| 6,855,884 B2 | 2/2005 | Spagnoli et al. | |
| D531,010 S | 10/2006 | Vrame | |
| 7,360,745 B2 | 4/2008 | Nikayin et al. | |
| 7,468,491 B2* | 12/2008 | Deciry | H02G 3/0443 174/135 |
| 7,601,922 B2* | 10/2009 | Larsen | F16L 3/26 174/481 |
| 7,699,283 B2 | 4/2010 | Vrame et al. | |
| 8,173,903 B2* | 5/2012 | Letourneur | H02G 3/0443 174/135 |

(Continued)

*Primary Examiner* — Tan Le
(74) *Attorney, Agent, or Firm* — Michael Best & Friedrich LLP

(57) ABSTRACT

A bracket for supporting an electrical device on a cable tray. A receiving area includes an aperture for fastening the electrical device. A plurality of retainers flanks the receiving area. The retainers are planar-formed of an integral, uniform-thickness sheet with the receiving area. The retainers extend away from each other on opposite sides of the receiving area, each formed with a relief of locally thickness-reduced sheet material along a line to define at least one fold axis for conforming the retainer to a portion of the cable tray to retain the bracket with respect to the cable tray, with the plurality of retainers extending directly over top outer edges of the cable tray. One or more of the retainers are provided along a first edge of the bracket for engaging a first edge of the cable tray, the first edge devoid of any fasteners and devoid of any fastener apertures.

19 Claims, 7 Drawing Sheets

(56) References Cited

U.S. PATENT DOCUMENTS

| | | | |
|---|---|---|---|
| 8,263,863 B2 | 9/2012 | Young | |
| 8,520,996 B2 | 8/2013 | Cowen et al. | |
| 8,559,783 B2 | 10/2013 | Campos et al. | |
| 9,293,809 B2 * | 3/2016 | Teillet | H01Q 1/246 |
| 9,447,914 B2 * | 9/2016 | Neace | H02G 3/32 |
| 9,568,697 B2 * | 2/2017 | Gallegos, III | G02B 6/4452 |
| 2016/0181778 A1 | 6/2016 | Kellerman | |

* cited by examiner

CABLE TRAY BRACKET

BACKGROUND

The present invention relates to industrial and commercial electrical systems and structures for supporting electrical cables. More particularly, the invention relates to brackets for mounting to cable trays.

SUMMARY

In one aspect, the invention provides a bracket for supporting an electrical device on a wire-form cable tray. A receiving area includes at least one aperture for fastening the electrical device. A plurality of retainers flanks the receiving area, each being planar-formed of an integral, uniform-thickness sheet material with the receiving area. The plurality of retainers includes retainers extending from opposite sides of the receiving area and away from each other. Each of the plurality of retainers is formed with a relief of locally thickness-reduced sheet material along a line to define at least one fold axis for conforming the retainer to a portion of the cable tray to retain the bracket with respect to the cable tray with the plurality of retainers extending directly over top outer edges of the cable tray. One or more of the plurality of retainers are provided along a first edge of the bracket for engaging a first top outer edge of the cable tray, and the first edge is devoid of any fasteners and devoid of any fastener apertures.

In another aspect, the invention provides a bracket for supporting an electrical device on a wire-form cable tray. A receiving area includes at least one aperture for fastening the electrical device. A plurality of retainers flanks the receiving area, each being planar-formed with the receiving area. The plurality of retainers includes a first pair of retainers spaced from each other in a first coordinate direction, each of the first pair of retainers extending from the receiving area along a second coordinate direction. The plurality of retainers includes a second pair of retainers spaced from each other in the first coordinate direction and spaced from the first pair of retainers in the second coordinate direction, each of the second pair of retainers extending from the receiving area along the second coordinate direction, oppositely from the first pair of retainers. Each of the plurality of retainers is formed with a first relief adjacent the receiving area to define a first fold axis, a second relief spaced further from the receiving area than the first relief and defining a second fold axis, and a third relief spaced further from the receiving area than the second relief and defining a third fold axis. Each of the plurality of retainers is formed with a pair of fastener apertures that can be aligned by bending the retainer along the first, second, and third fold axes to receive a single threaded fastener. One of the pair of fastener apertures is smaller than the other of the pair of fastener apertures so as to act as a nut for the threaded fastener.

In another aspect, the invention provides a method of accessorizing a wire cable tray. A mounting bracket is provided with a receiving area and a plurality of retainers, the entire mounting bracket, including the receiving area and the plurality of retainers, having a flat sheet construction. The mounting bracket is applied to an exterior portion of the wire cable tray. Each of the plurality of retainers is bent about one or more reliefs formed therein to define one or more respective fold axes. At least one electronic device is secured to the mounting bracket with a fastener, the fastener engaging both a portion of the electronic device and an aperture in the receiving area.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
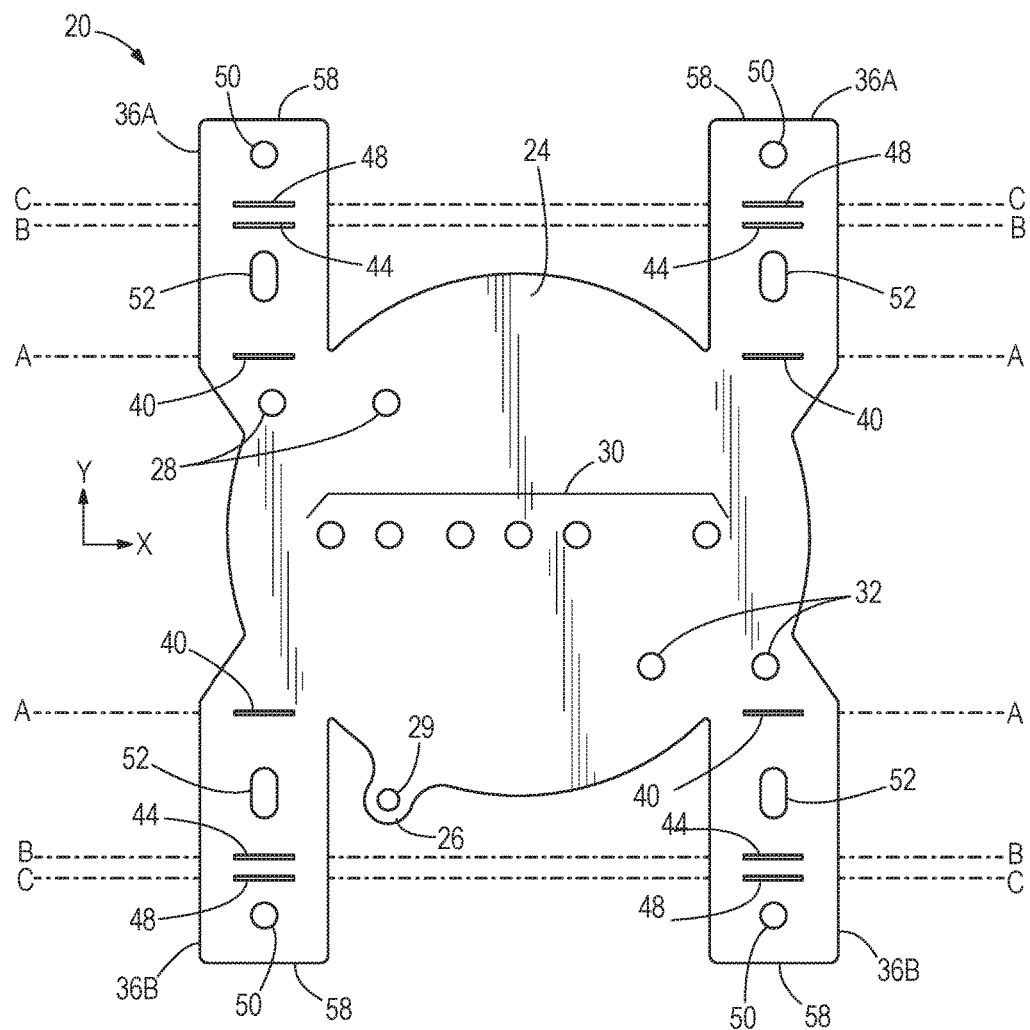
FIG. 1 is a plan view of a cable tray bracket according to one embodiment of the invention.
Figure 2:
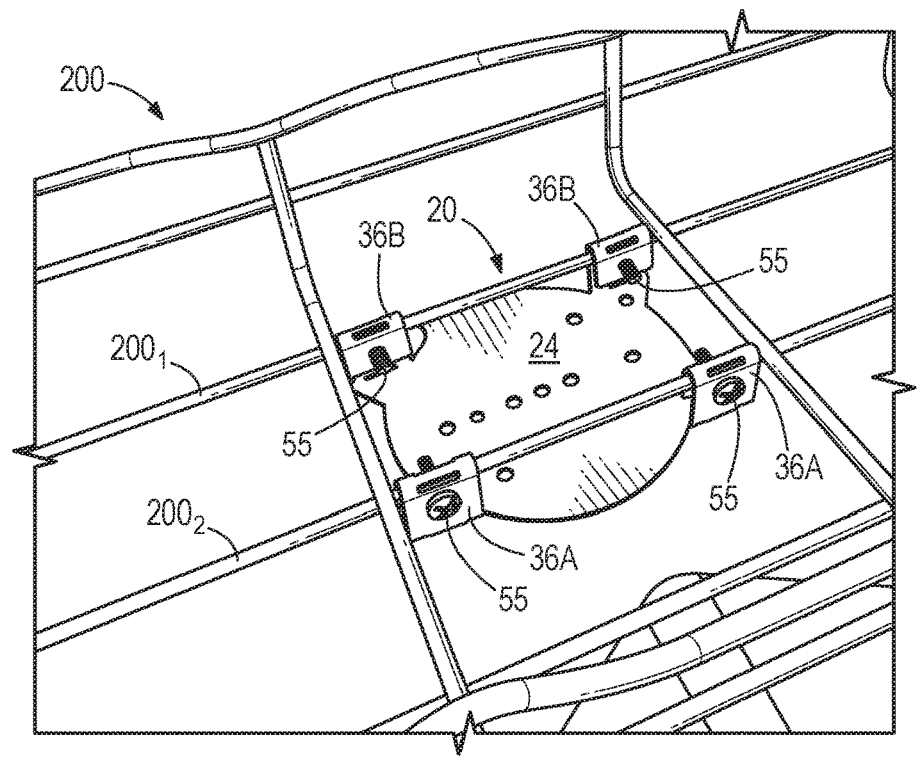
FIG. 2 is a perspective view of the cable tray bracket of FIG. 1, as formed and installed on a wire cable tray.

FIG. 1 illustrates a formable bracket 20 for attachment to a wire cable tray 200 (FIG. 2). In some constructions, the bracket 20 is formed of sheet metal (e.g., a single sheet). Whether metal or another material, the bracket 20 can be manufactured in a planar sheet form and adapted for shaping (e.g., in the field at the time of installation) by bending at designated locations for at least partially conforming to portions of the cable tray 200. As shown in FIG. 1, a central portion of the bracket 20 forms a receiving area 24 including at least one aperture 28, 30, 32. The receiving area 24 can provide a flat exterior surface for fastening (e.g., directly thereto) one or more electrical devices (e.g., modules for connecting field input/output devices in a PLC or other type of automation system, sometimes referred to as "slaves" or "input/output cards", and/or field devices themselves, including but not limited to push buttons, actuators, position sensors, encoders, pneumatic solenoid valves, enunciators such as lights, lamps, etc.). The receiving area 24 is delineated by a plurality of arcuate perimeter edges. In the illustrated construction, all of the arcuate perimeter edges share a common radius and center so that the receiving area 24 has the shape of an incomplete circle. A wide variety of other shapes, including rounded and/or flat edges, are optional in the bracket 20. Extending from one of the arcuate perimeter edges is a protuberance or projecting tab 26 in which an additional aperture 29 is provided. The projecting tab 26 is one example of an extension of the receiving area 24, and the additional aperture 29 is provided to accommodate yet another electrical device (not shown). Any number of appendages to the receiving area 24 may be provided (e.g., with apertures for alternate electrical devices) in other constructions.

The bracket 20 further includes a plurality of retainers 36A, 36B flanking the receiving area 24. Each retainer 36A, 36B is planar-formed with the receiving area 24. The plurality of retainers includes a first pair of retainers 36A spaced from each other in a first coordinate direction X. Each of the first pair of retainers 36A extends from the receiving area 24 along a second coordinate direction Y. The second coordinate direction Y is perpendicular to the first coordinate direction X in the illustrated construction. As illustrated, the plurality of retainers further includes a second pair of retainers 36B spaced from each other in the first coordinate direction X and spaced from the first pair of retainers 36A in the second coordinate direction Y. Each of the second pair of retainers 36B extends from the receiving area 24 along the second coordinate direction Y, oppositely from the first pair of retainers 36A. The retainers 36A of the first pair of are mirror images of each other and symmetrically placed with respect to the receiving area 24. The retainers 36B of the second pair of are also mirror images of each other and symmetrically placed with respect to the receiving area 24. Further, the first and second pairs of retainers 36A, 36B are mirror images of each other and symmetrically placed with respect to the receiving area 24.

Each retainer 36A, 36B is formed with a first relief 40 adjacent the receiving area 24 to define a first fold axis A, a second relief 44 spaced further from the receiving area 24 than the first relief 40 and defining a second fold axis B, and a third relief 48 spaced further from the receiving area 24 than the second relief 44 and defining a third fold axis C. In addition to the reliefs, each retainer 36A, 36B is formed with a pair of fastener apertures 50, 52 that can be aligned by bending the retainer along the first, second, and third fold axes A, B, C to receive a single threaded fastener 55 (FIG. 2). Each retainer 36A, 36B can be bent along the three fold axes A, B, C by hand or with a hand-held tool into a U-shape, or 180-degree turn such that the retainer defines a wraparound retainer for wrapping around an individual wire of the cable tray 200. In other constructions, wraparound retainers may take other forms having multiple reliefs, a single relief, or no reliefs. The reliefs 40, 44, 48 can be configured to match a span between wires of the cable tray 200 and relieve the installer of the need to accurately place bends in the retainers 36A, 36B. Each relief 40, 44, 48 is provided as a line of locally reduced sheet thickness (e.g., including in some cases the elimination of the sheet thickness, leaving a localized absence of sheet material) to ease the force required for bending and to reliably determine the location of the fold when exposed to a bending moment during installation. Each of the reliefs 40, 44, 48 can extend a length at least partially across a width direction (first coordinate direction X) of the corresponding retainer 36A, 36B (e.g., each relief 40, 44, 48 can extend across at least one-third of a width of the retainer 36A, 36B defined in the first coordinate direction X). In some constructions, including the illustrated construction, the reliefs 40, 44, 48 may be located centrally along the retainer width. In some constructions, the reliefs 40, 44, 48 are cut (e.g., laser cut) to form apertures through the retainers 36A, 36B and the reliefs 40, 44, 48 extend less than the full width of the retainers 36A, 36B. In other constructions, the reliefs 40, 44, 48 do not fully pierce the sheet material of the retainers 36A, 36B (e.g., laser engraved into the surface), and the reliefs 40, 44, 48 may optionally extend all the way across the widths of the retainers 36A, 36B. In each retainer 36A, 36B, a first one 50 of the pair of fastener apertures is smaller than the other 52 of the pair of fastener apertures. In practice, the first fastener aperture 50 is configured to act as a nut for the threaded fastener 55 (e.g., a precision screw hole that does not have a diametric clearance for the outer thread diameter of the threaded fastener 55). The first fastener aperture 50 is positioned between the third relief 48 and a distal end 58 of the retainer. The second fastener aperture 52 is positioned between the first and second reliefs 40, 44.

FIG. 2 illustrates the attachment of the bracket 20 to the cable tray 200. The bracket 20 can be mounted to a bottom portion of the cable tray 200 that supports cables laid into the tray 200, and opposite an open top portion of the cable tray 200. The bracket 20 can be assembled with the bottom portion of the cable tray 200 from below the cable tray 200. The bracket 20 provides a flat mounting area, the receiving area 24, spaced below the bottom portion of the cable tray 200 for mounting an electrical device directly below the internal cable-receiving area of the cable tray 200. The pairs of retainers 36A, 36B can engage and be secured to two parallel wires $200_1$ and $200_2$ of the cable tray 200 as shown. The two parallel wires $200_1$ and $200_2$ can be two directly adjacent wires of the cable tray 200 as shown, or may be spaced by one or more additional wires. The two parallel wires $200_1$ and $200_2$ can be two lengthwise extending wires of the cable tray 200 as shown, or may be transversely extending wires (e.g., transverse to the direction of the cables laid therein). As shown, the bracket 20 can be placed on the cable tray 200 so as to be trapped within or between two adjacent structures of the cable tray 200, such as two transverse wires, thus preventing lengthwise shifting of the bracket 20 beyond either of the two adjacent structures. For example, the lengthwise span of the bracket 20 at the outermost edges of the retainers 36A, 36B can be 90 to 99 percent of the span between the two transverse wires or other structures of the cable tray 200.

Figure 3:
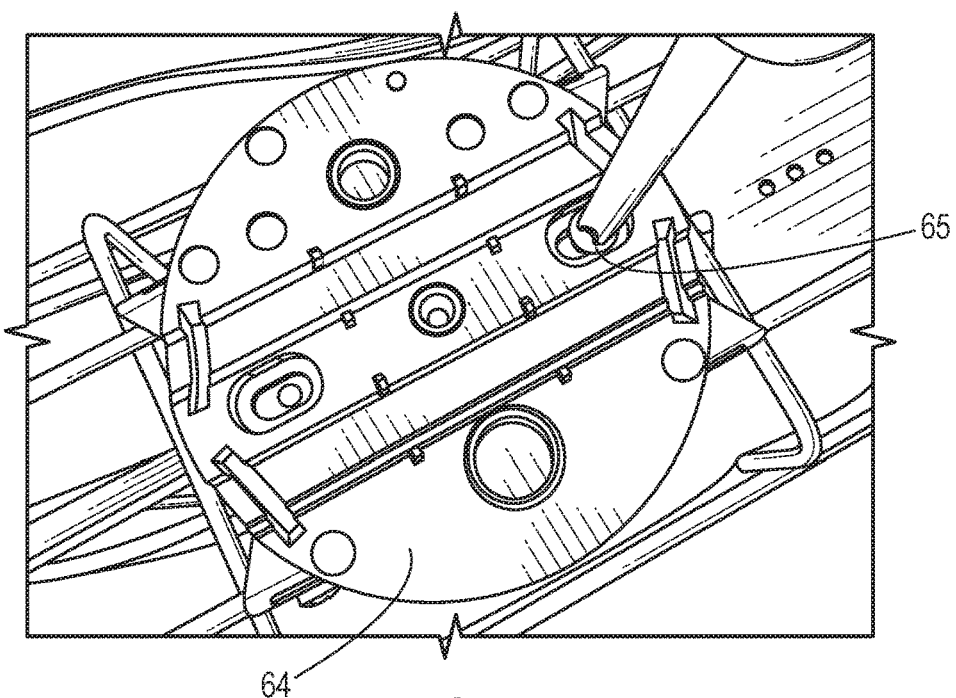
FIGS. 3-5 illustrate the mounting of an electrical device mounted to a receiving area of the cable tray bracket of FIGS. 1 and 2.
Figure 4:
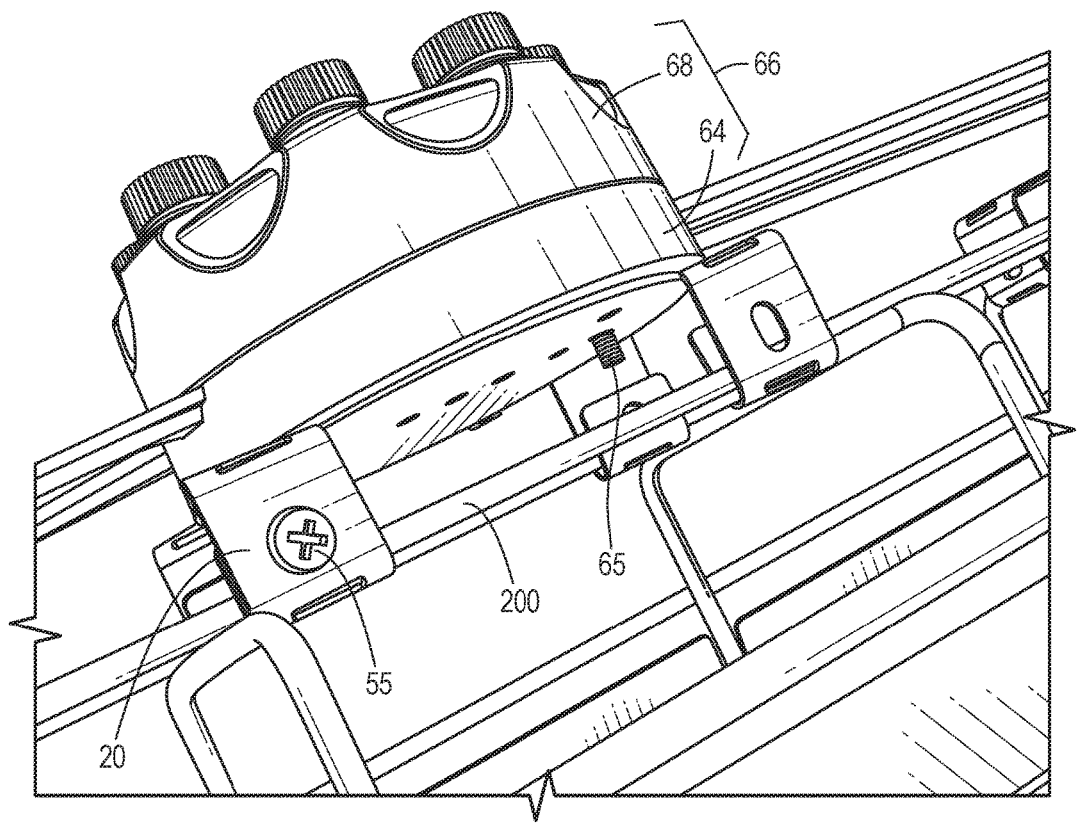
Figure 5:
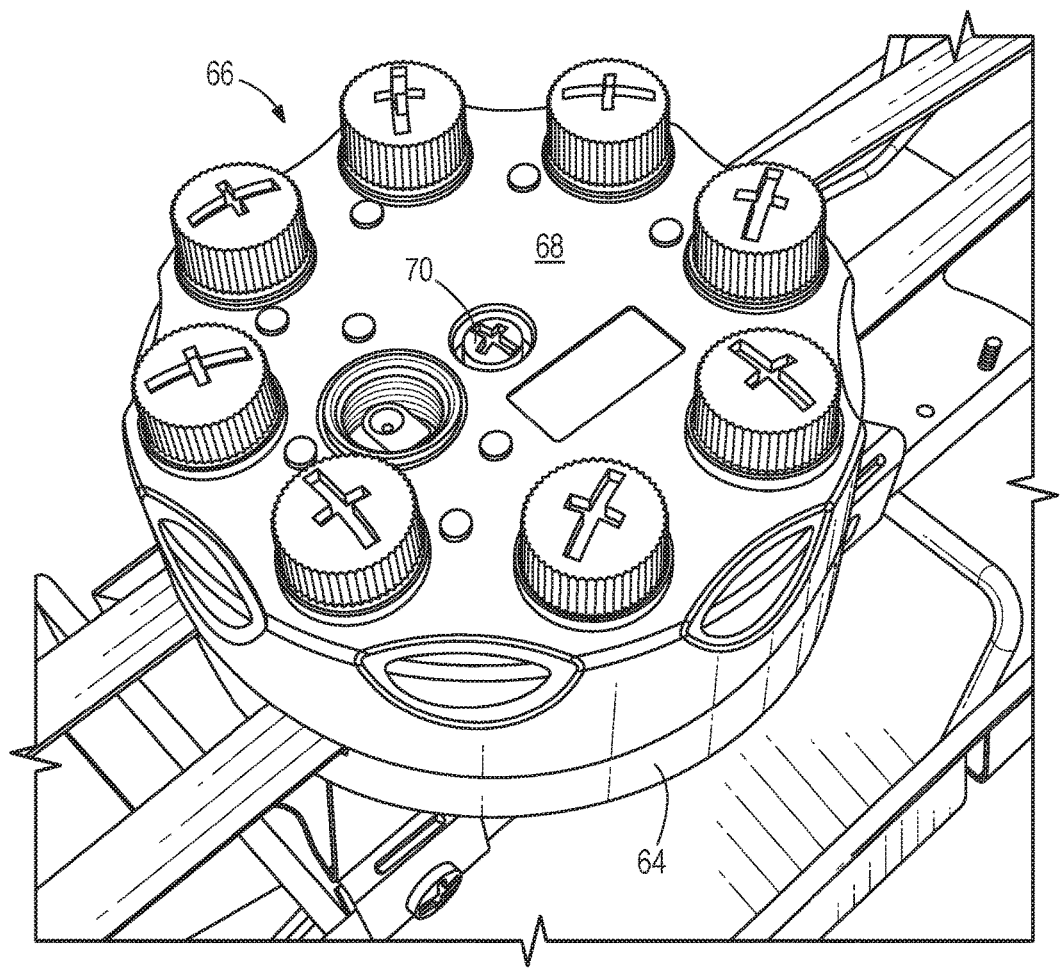

FIG. 3 illustrates the attachment of a base 64 of an electrical device 66 to the bracket 20 with an additional fastener 65 (e.g., screw), using one of the apertures 30 in the receiving area 24. Although numerous electrical devices can be mounted to a bracket like that of the present disclosure, the illustrated electrical device is a 4-input, 4-output actuator-sensor interface (AS-i) module. A top portion 68 of the module 66 having the inputs and outputs is shown in FIGS. 4 and 5. The top portion 68 is coupled to the base 64 by an additional fastener 70 (e.g., screw) after the base 64 is secured to the bracket 20, and after a pair of cables 72 are laid into the base 64.

Figure 6:
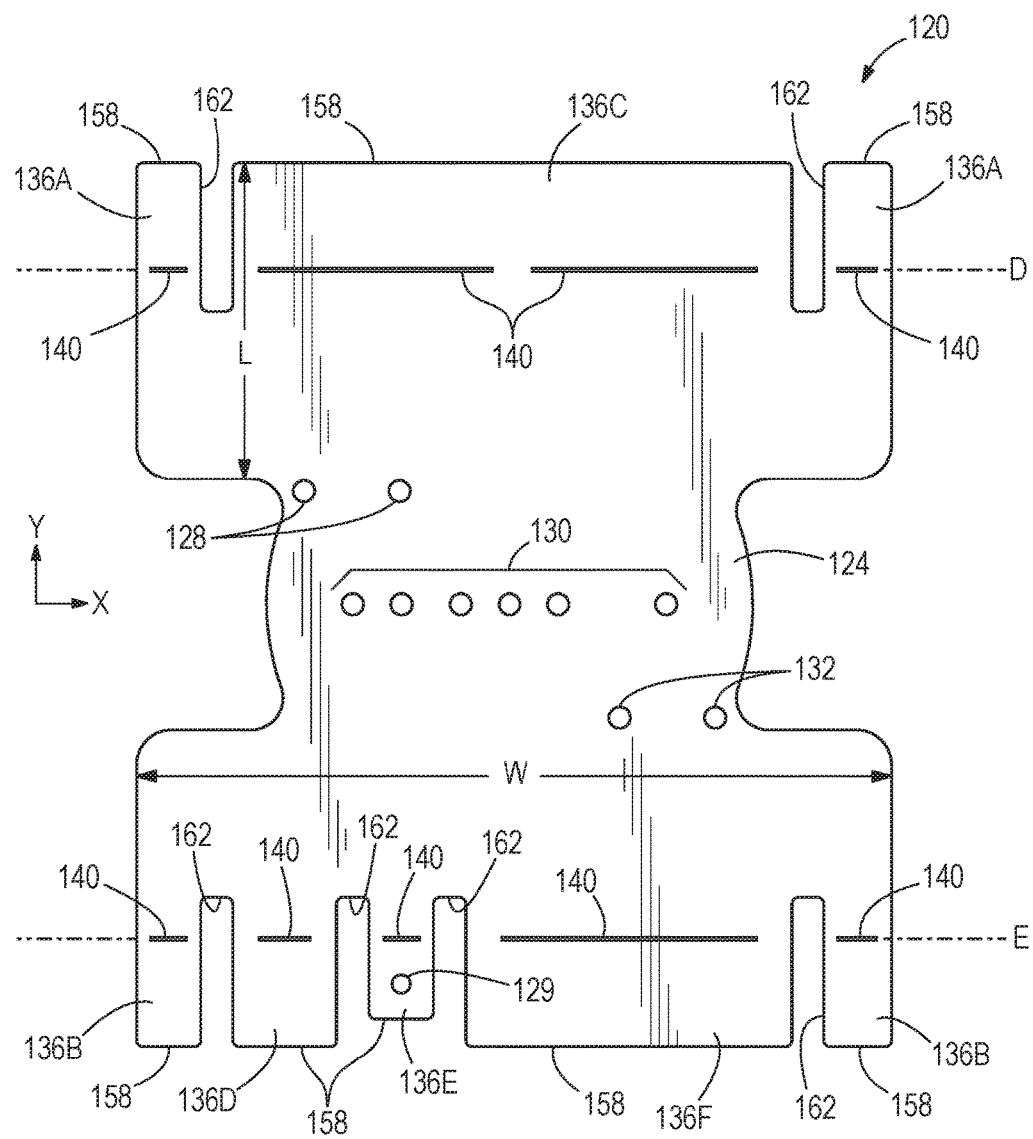
FIG. 6 is a plan view of a cable tray bracket according to another embodiment of the invention.

FIG. 6 illustrates a bracket 120 of another construction. Although a number of similarities are present between the bracket 120 and the bracket 20 of FIGS. 1-5, the bracket 120 is a top-mount design for assembly over the top portion of the cable tray 200. The bracket 120 can be used in a particular cable tray 200 in addition to the bracket 20, or as an alternative. The bracket 120 can be formed of sheet metal (e.g., a single sheet). Whether metal or another material, the bracket 120 can be manufactured in a planar sheet form. Rather than having retainers that each fold into a U-shape or 180-degree turn, the bracket 120 of FIG. 6 features a number of retainers 136A-136F that each includes a single relief 140 so that each retainer can be bent to form a (e.g., 90-degree) tab. Some or all of the retainers 136A-136F are provided with no apertures, as the top-mount bracket 120 can be installed without the use of any fasteners. Thus, the bracket 120 can be directly coupled to the cable tray 200 at two opposed edges thereof with a simple light clamping action that allows upward movement (e.g., pivoting) of the bracket 120 to access the interior of the cable tray, even when devices are mounted to a receiving area 124 formed by the top bracket surface. The receiving area 124 can be generally of the same construction as that discussed above, for example, including the respective groups of apertures 128, 130, 132. The receiving area 124 may also have perimeter portions defined by arcuate segments on at least two opposing sides (e.g., in the first coordinate direction X).

Although the retainers 136A-136F all extend in parallel, opposing directions parallel to the second coordinate direction Y, the retainers 136A-136F have an alternate construction compared to the retainers 36A, 36B of the bottom-mount bracket 20 of FIGS. 1-5. On a first side of the bracket 120, a first pair of retainers 136A is provided, and opposite the first pair is a second pair of retainers 136B extending from an opposite side of the receiving area 124. The first and second pairs of retainers 136A, 136B may be mirror images of each other. However, at least one additional retainer 136C is provided between the first pair of retainers 136A, and at least one additional retainer 136D, 136E, 136F is provided between the second pair of retainers 136B. In the illustrated construction, the additional retainers on the two opposing sides do not match in number or form such that the bracket 120 is not symmetrical about a central axis through the receiving area 124. On the first side, the additional retainer 136C spans a width in the first coordinate direction X that is significantly greater than that of either of the other retainers 136A, and even greater than the combined width of the first pair of retainers 136A. The additional retainer 136C can define a majority (e.g., two-thirds or more) of a total width W of the retainers 136A, 136C on the first side. On the second side, the additional retainers 136D, 136E, 136F as a group define a majority of a total width W. It is also noted that the total widths W of the two opposite sides are equal in the illustrated constructions.

Perpendicular to the width W, each group of retainers (i.e., 136A and 136C; and 136B, 136D, 136E, 136F) defines a length L along the second coordinate direction Y. The lengths L can be the same for both retainer groups. Furthermore, the length L can be defined as the extent along the second coordinate direction Y from the receiving area 124 to a furthest distal end 158 of one of the retainers. As illustrated, each and every one of the retainers 136A-136F has the same length L to its distal end 158. The retainers on a given side of the bracket 120 are spaced from each other by slits 162. The slits 162 can be thinner in the width direction than any and all of the retainers 136A-136F. Each slit 162 can extend a distance from the distal ends 158 toward the receiving area 124 that is less than the overall length L. For example, the slits 162 can extend about half the length L (e.g., 35 percent to 65 percent, or more particularly 45 percent to 55 percent). The slits 162 can be positioned and sized to accommodate various transversely-extending wires of the cable tray 200 when the bracket 120 is installed. A width-direction slit-to-slit dimension can be predetermined to match a spacing of cable tray structures, such as wires, to be accommodated within the slits 162. It is noted that, maintaining the positions of the slits 162 on the first side, the retainer 136C may be divided by the removal of one or more inboard areas spaced from the slits 162. In fact, in some constructions, a majority of the retainer 136C may be removed, leaving at least the two edges defining the two respective slits 162.

At a lengthwise distance from the distal end 158 that is less than the length of the slits 162, each retainer 136A-136F includes a relief 140 (e.g., one and only one relief). The reliefs 140 of the retainers 136A, 136C on the first side define a first fold axis D, and the reliefs 140 of the other retainers 136B, 136D, 136E, 136F define a second fold axis E parallel to the first fold axis D. Each relief 140 is provided as a line of locally reduced sheet thickness (e.g., including in some cases the elimination of the sheet thickness, leaving a localized absence of sheet material forming a slit or aperture) to ease the force required for bending and to reliably determine the location of the fold when exposed to a bending moment during installation. Each relief 140 can extend at least partially across a width direction (first coordinate direction X) of the corresponding retainer 136A-136F (e.g., some or all of the reliefs 140 can extend across at least one-third of a width of the retainer as defined in the first coordinate direction X). In some constructions, including the illustrated construction, some or all of the reliefs 40 may be located centrally along the retainer width. However, the widest of the retainers 136C includes two separate, aligned reliefs 140 in the illustrated construction. In some constructions, the reliefs 140 are cut (e.g., laser cut) to form apertures through the retainers 136A-136F and the reliefs 140 extend less than the full width of the retainers. In other constructions, the reliefs 140 do not fully pierce the sheet material of the retainers (e.g., laser engraved into the surface), and the reliefs 140 may optionally extend all the way across the widths of the retainers.

At least one of the retainers 136E may be provided with an additional aperture 129 for providing a mounting location for yet another optional electrical device (not shown). As such, the retainer 136E may alternately be considered as a projection or extension of the receiving area 124 rather than a retainer. In some constructions, the structure identified as the retainer 136E has the relief 140, while in other constructions the relief may be omitted. It is also noted that, as illustrated in FIG. 6, the distal end 158 of the retainer 136E may set inward, closer to the receiving area 124, as compared to the distal ends 158 of the adjacent retainers 136B, 136D, 136F. This may be the result of the retainer 136E having a comparatively shorter length. Any number of appendages to the receiving area 124 may be provided (e.g., with apertures for alternate electrical devices) in other constructions.

Figure 7:
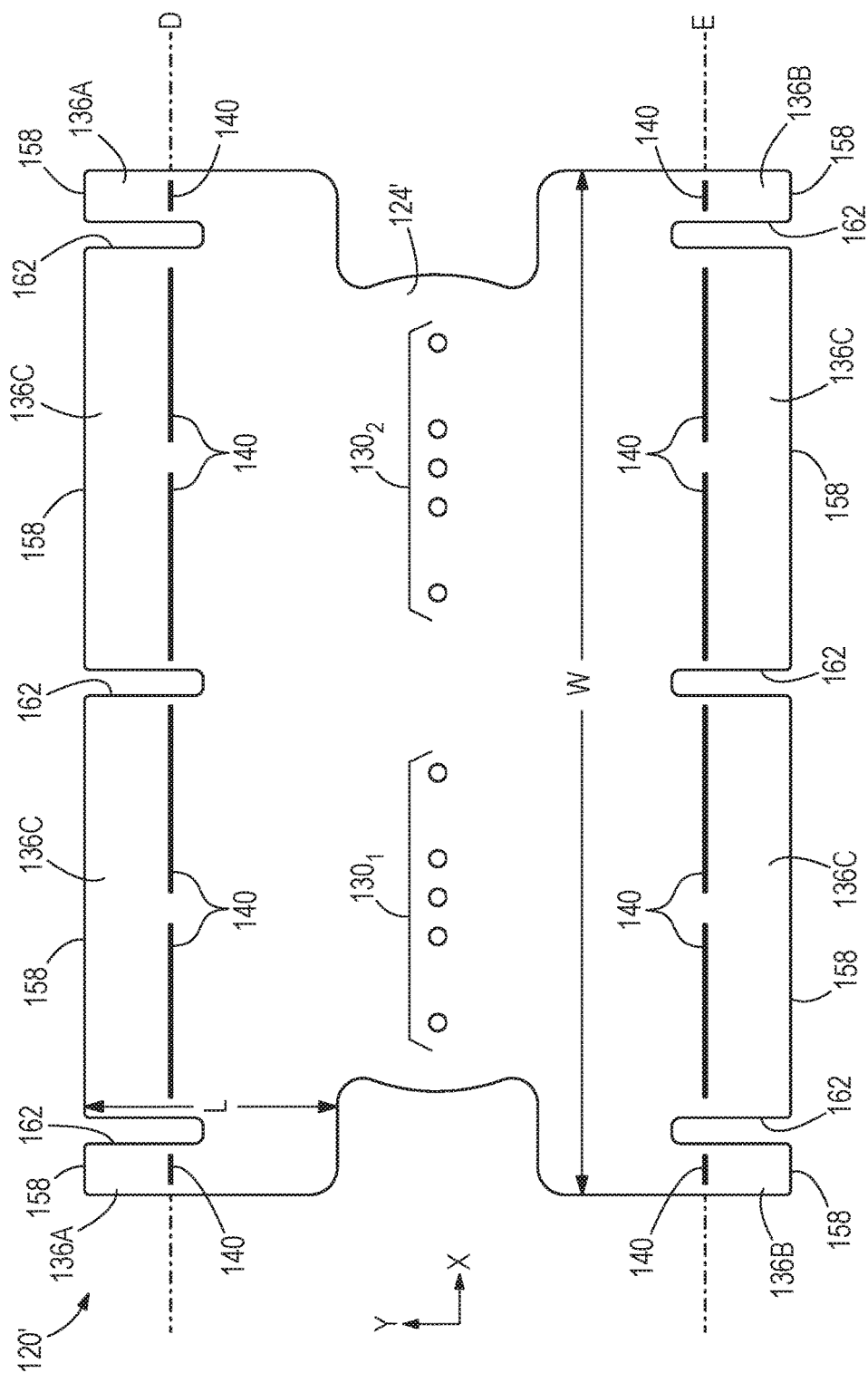
FIG. 7 is a plan view of a cable tray bracket according to yet another embodiment of the invention.

FIG. 7 illustrates a bracket 120' of another construction, which in many respects may be considered a modified version of the bracket 120 of FIG. 6. Like the bracket 120, the bracket 120' of FIG. 7 is a top-mount design for assembly over the top portion of the cable tray 200. The bracket 120 can be used in a particular cable tray 200 in addition to either or both of the brackets 20, 120, or as an alternative. The bracket 120' can be formed of sheet metal (e.g., a single sheet). Whether metal or another material, the bracket 120' can be manufactured in a planar sheet form. The bracket 120' of FIG. 7 features a number of retainers 136A-136C that each includes a single relief 140 so that each retainer can be bent to form a (e.g., 90-degree) tab. Some or all of the retainers 136A-136C are provided with no apertures, as the top-mount bracket 120' can be installed without the use of any fasteners. Thus, the bracket 120' can be directly coupled to the cable tray 200 at two opposed top outer edges thereof with a simple light clamping action that allows upward movement (e.g., pivoting) of the bracket 120' to access the interior of the cable tray 200, even when devices are mounted to a receiving area 124' formed by the top bracket surface. The receiving area 124' can be similar to those discussed above, but generally larger and adapted for attaching and supporting multiple electrical devices. In this way, the bracket 120' is a dual or double version of the bracket 120 of FIG. 6. The receiving area 124' of the bracket 120' includes two separate groups of apertures $130_1$, $130_2$. The two groups of apertures $130_1$, $130_2$ can be identical to each other. The two groups of apertures $130_1$, $130_2$ can be provided as shown in a single row or line arrangement. The two groups of apertures $130_1$, $130_2$ may be the only apertures in the receiving area 124' as shown, although additional apertures or groups of apertures can be provided in other constructions.

Although the retainers 136A-136C all extend in parallel, opposing directions parallel to the second coordinate direction Y and have a similar construction to retainers of the bracket 120, the retainers 136A-136C have an alternate arrangement as compared to the bracket 120 of FIG. 6. On a first side of the bracket 120', a first pair of retainers 136A is provided, and opposite the first pair is a second pair of retainers 136B extending from an opposite side of the receiving area 124'. The first and second pairs of retainers 136A, 136B may be mirror images of each other as with the bracket 120. At least one additional retainer 136C is provided between the first pair of retainers 136A, and at least one additional retainer 136C is provided between the second pair of retainers 136B. In the illustrated construction, the additional retainers on the two opposing sides match in number and form such that the bracket 120' is symmetrical about a central axis through the receiving area 124'. On the first side, two additional retainers 136C are provided between the first retainer pair 136A, and each of these has a structure similar to or identical to the retainer 136C of FIG. 6. The additional retainers 136C can define a majority (e.g., two-thirds or more) of a total width W of the retainers 136A, 136C on the first side, and the same is true with respect to the additional retainers 136C and the second retainer pair 136B on the second side. With respect to the length L of the retainer groups, the reliefs 140, and the slits 162, these details of the bracket 120' conform to the above description of the bracket 120 and thus, a duplicate description is not provided.

Figure 8:
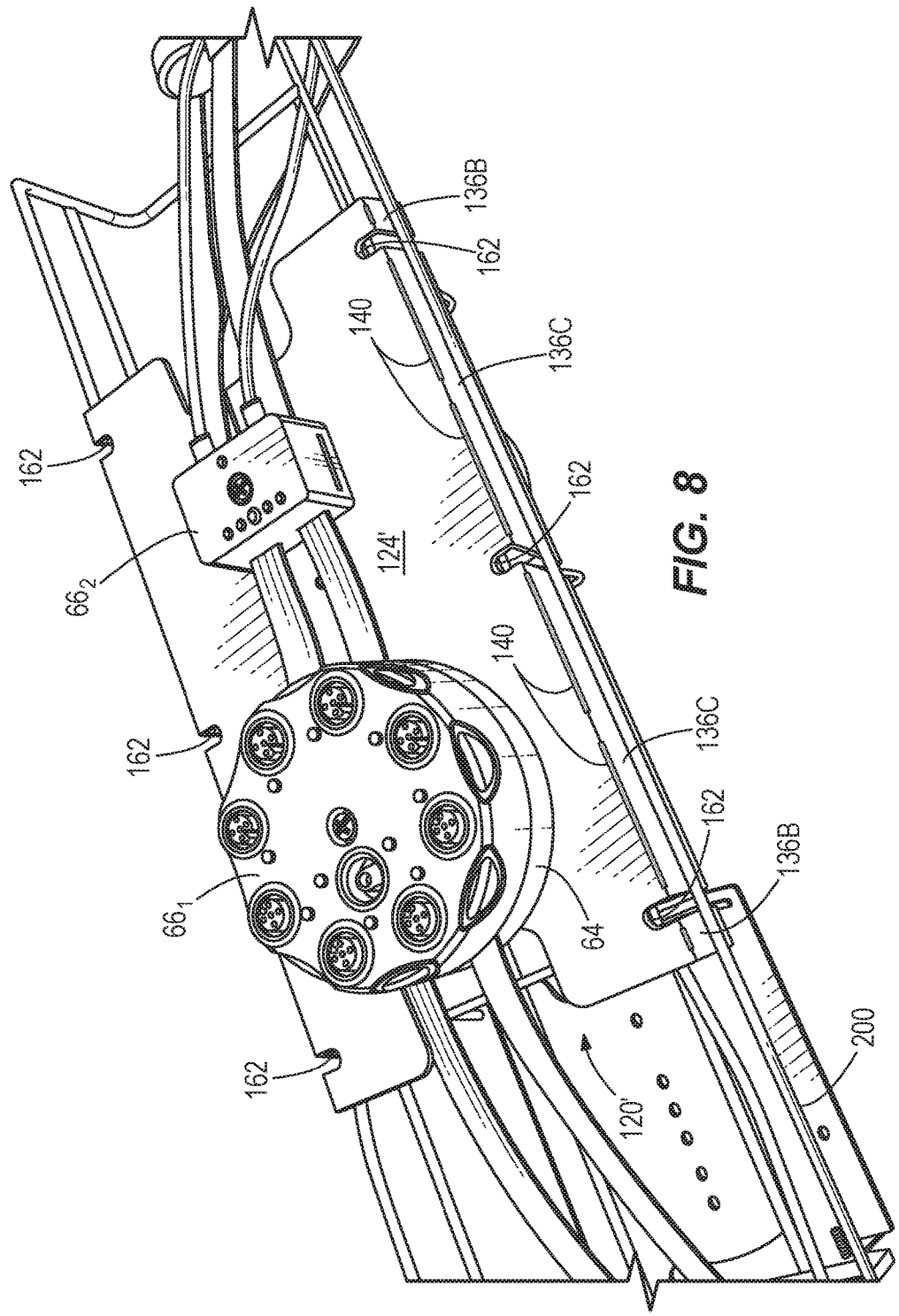
FIG. 8 is a perspective view of the cable tray bracket of FIG. 7, as formed and installed on a wire cable tray.

FIG. 8 illustrates the bracket 120' of FIG. 7 in the installed position on the top portion of the cable tray 200. Each retainer 136A-136C is bent at an angle from the receiving area 124' so as to bend over the top outer edge of the cable tray 200, thus inhibiting transverse movement of the bracket 120' across the cable tray 200. The configuration of the retainers 136A-136C and the reliefs 140 therein, which provide for a single fold axis D, E on each side of the bracket 120', may enable bending into the installation shape of FIG. 8 by hand, without any separate tools. However, some users may elect to use utilize one or more tools (e.g., basic hand tools such as pliers). The other brackets 20, 120 disclosed herein can also be bent into the respective installation shapes by hand or with the aid of basic hand tools. At least one aperture of each of the separate groups of apertures $130_1$, $130_2$ are utilized so as to be engaged by a fastener to mount an electronic device (e.g., directly thereto). In the illustrated construction, an aperture of the first group $130_1$ is engaged by a fastener (not shown) to mount a base 64 of a first electrical device $66_1$ to the bracket 120' in the same manner as FIGS. 3-5. Although numerous electrical devices can be mounted to the bracket 120', the first electrical device $66_1$ is a 4-input, 4-output actuator-sensor interface (AS-i) module as illustrated. An aperture of the second group $130_2$ is engaged by a fastener (not shown) to mount a second electrical device $66_2$ (e.g., a 2-input, 1-output compact actuator-sensor interface (AS-i) module as illustrated).

As mentioned briefly above, the brackets 120, 120' of FIGS. 6-8 can be configured to allow pivoting from the cable tray 200 without disassembly or removal of fasteners from the fully assembled state. Each bracket 120, 120' can include at least one entire edge, including any number of retainers, for engaging a first top outer edge of the cable tray 200, the bracket edge being devoid of any fasteners and devoid of any fastener apertures. Thus, even if the bracket 120, 120' has already been installed onto the cable tray 200 by deformation of the retainers to form bent tabs extending over the top outer edges of the cable tray 200, a worker can access the interior of the cable tray 200 (e.g., to add or adjust cables, etc.) by simply raising one edge of the bracket 120, 120' off of the cable tray 200. The worker may choose to adjust the bend angle of the retainer(s) in doing so.

Various aspects of the invention are set forth in the following claims.

What is claimed is:

1. A method of accessorizing a wire cable tray, the method comprising:
   providing a mounting bracket having a receiving area and a plurality of retainers, the entire mounting bracket, including the receiving area and the plurality of retainers, having a flat sheet construction;
   forming one or more reliefs in each of the plurality of retainers, each of the one or more reliefs formed as a line of locally reduced sheet thickness;
   applying the mounting bracket to an exterior portion of the wire cable tray;
   bending each of the plurality of retainers about the one or more reliefs formed therein to define one or more respective fold axes; and
   securing at least one electronic device to the mounting bracket with a fastener, the fastener engaging both a portion of the electronic device and an aperture in the receiving area.

2. The method of claim 1, wherein at least one of the plurality of retainers is bent about multiple reliefs defining multiple fold axes therein, thus defining a wraparound retainer, the method further comprising securing the wraparound retainer around an individual wire of the wire cable tray by engaging a fastener in two apertures of the wraparound retainer.

3. The method of claim 2, wherein the mounting bracket is applied to a bottom exterior portion of the wire cable tray.

4. The method of claim 1, wherein at least two of the plurality of retainers on a first side of the mounting bracket are wrapped over a first upper edge of the wire cable tray and at least two of the plurality of retainers on a second side of the mounting bracket are wrapped over a second upper edge of the wire cable tray, at least one of the first and second sides left unsecured by any additional fasteners to enable pivoting of the mounting bracket from the wire cable tray.

5. The method of claim 1, wherein one or more of the plurality of retainers are bent at least partially prior to applying the mounting bracket to the exterior portion of the wire cable tray.

6. The method of claim 1, wherein one or more of the plurality of retainers are bent at a downward angle from the receiving area over at least one upper edge of the wire cable tray.

7. The method of claim 1, further comprising:
   selecting a second aperture from a first group of apertures in the mounting bracket arranged in a row with respect to the aperture; and
   further securing the at least one electronic device to the mounting bracket with a second fastener engaging both a portion of the electronic device and the second aperture.

8. The method of claim 7, further comprising securing a second electronic device to the mounting bracket with a third fastener engaging both a portion of the second electronic device and a third aperture in the mounting bracket.

9. The method of claim 1, wherein each of the plurality of retainers is bent exclusively about a single fold axis to form a 90-degree tab.

10. A method of accessorizing a cable tray, the cable tray having a first upper edge and a second upper edge spaced laterally from the first upper edge, the method comprising:
providing a mounting bracket having a receiving area and plurality of retainers flanking the receiving area, the entire mounting bracket, including the receiving area and the plurality of retainers, having a flat sheet construction;
applying the mounting bracket to one or both of the first upper edge and the second upper edge of the cable tray such that the receiving area extends at least partially between the first upper edge and the second upper edge and the plurality of retainers extend laterally outside one or both of the first upper edge and the second upper edge;
bending each of the plurality of retainers relative to the receiving area over one or both of the first upper edge and the second upper edge of the cable tray; and
securing at least one electronic device to the receiving area of the mounting bracket.

11. The method of claim 10, wherein bending each of the plurality of retainers includes bending at least two of the plurality of retainers on a first side of the mounting bracket to wrap over the first upper edge of the cable tray, and bending at least one of the plurality of retainers on a the second side of the mounting bracket to wrap over the second upper edge of the cable tray.

12. The method of claim 10, wherein one or more of the plurality of retainers are bent at least partially prior to applying the mounting bracket to one or both of the first upper edge and the second upper edge of the cable tray.

13. The method of claim 10, wherein securing the at least one electronic device to the receiving area of the mounting bracket includes securing a first electronic device with a fastener engaging both a portion of the first electronic device and an aperture in the receiving area, the method further comprising:
selecting a second aperture from a first group of apertures in the mounting bracket arranged in a row with respect to the aperture;
further securing the first electronic device to the mounting bracket with an additional fastener engaging both a portion of the first electronic device and the second aperture; and
securing a second electronic device to the mounting bracket with a third fastener engaging both a portion of the second electronic device and a third aperture in the mounting bracket.

14. The method of claim 10, the method further comprising:
providing at least one of a first side or a second side of the mounting bracket unsecured by any additional fasteners; and
pivoting at least one of a first side or a second side of the mounting bracket from the cable tray.

15. The method of claim 10, wherein each of the plurality of retainers is bent exclusively about a single fold axis to form a 90-degree tab.

16. A method of accessorizing a cable tray, the method comprising:
providing a mounting bracket having a receiving area, and a plurality of retainers, the plurality of retainers including at least two retainers on a first side of the mounting bracket and at least one retainer on a second side of the mounting bracket that is opposite the first side, the entire mounting bracket, including the receiving area and the plurality of retainers, having a flat sheet construction;
applying the mounting bracket to an exterior portion of the cable tray;
bending each of the at least two retainer on the first side of the mounting bracket over a first upper edge of the cable tray and the at least one retainer on the second side of the mounting bracket in the same direction from the receiving area over a second upper edge of the cable tray; and
securing at least one electronic device to the receiving area of the mounting bracket.

17. The method of claim 16, wherein one or more of the plurality of retainers are bent at least partially prior to applying the mounting bracket to the exterior portion of the cable tray.

18. The method of claim 16, wherein each of the plurality of retainers is bent exclusively about a single fold axis to form a 90-degree tab.

19. The method of claim 16, wherein at least one of the plurality of retainers is bent about multiple reliefs defining multiple fold axes therein, thus defining a wraparound retainer, the method further comprising securing the wraparound retainer around an individual wire of the cable tray by engaging a fastener in two apertures of the wraparound retainer.

* * * * *